June 5, 1934.　　　J. M. CRAWFORD　　　1,961,340
SYNCHRONIZING CLUTCH MECHANISM

Filed Jan. 11, 1932

Inventor
James M. Crawford

By Blackmore, Spencer & Flint
Attorneys

Patented June 5, 1934

1,961,340

UNITED STATES PATENT OFFICE 1,961,340

SYNCHRONIZING CLUTCH MECHANISM

James M. Crawford, Detroit, Mich., assignor to General Motors Corporation, Detroit, Mich., a corporation of Delaware Application January 11, 1932, Serial No. 585,946

5 Claims. (Cl. 192—53)

This invention relates to change speed transmission mechanism, particularly to such a mechanism employing means to frictionally effect synchronization between parts to be thereafter positively engaged.

Transmission mechanism of the kind referred to above is now in use and employs cooperating frictional clutch elements one of which is associated with a first one of the parts to be positively engaged and the other of which frictional elements is mounted for limited rotary and axial movement, the second and movable one of the parts to be engaged acting to move the movable frictional element to cause it to engage the other frictional element whereby frictional synchronization is obtained.

The object of this invention is to provide improved means to space the movable frictional member and to serve as a detent through the instrumentality of which the engagement of the frictional clutch elements is obtained.

As another object the invention provides for the use of a single part having both the above mentioned functions.

Other objects and advantages will be understood from the following description.

The invention is illustrated in the accompanying drawing in which—

Figure 1:
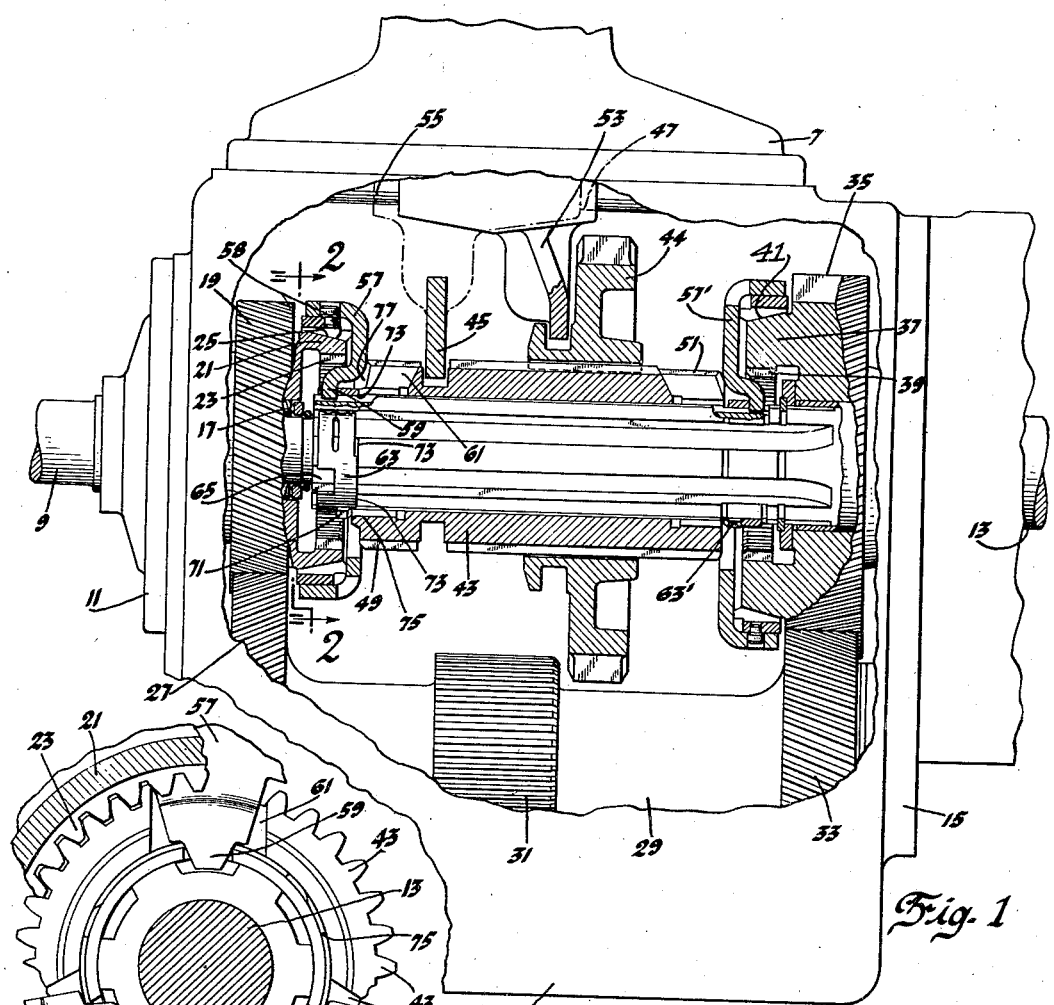
Fig. 1 is a side elevation of a change speed unit, partly broken away and in section to show my invention.
Figure 2:
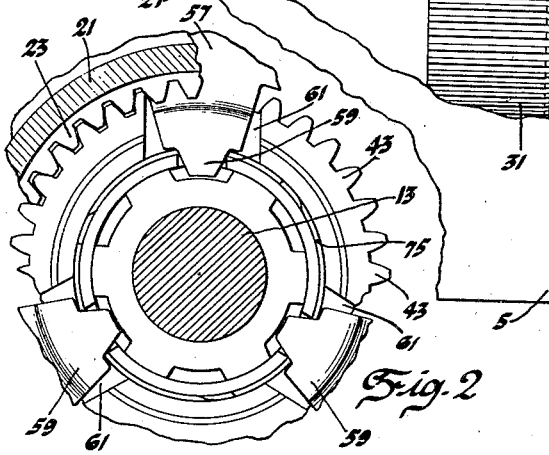
Fig. 2 is a section on line 2—2 of Fig. 1.

Referring by reference characters to the drawing, numeral 5 represents a housing for the change speed mechanism. It is provided with a cover 7. A drive shaft 9 enters the front wall 11 of the housing. A driven shaft 13 enters the housing 5 through its rear wall 15. Bearings, not shown, are provided to journal the shafts in the walls as usual. Also, and in a conventional way, a bearing 17 supports the front end of the shaft 13 in the recessed end of the driving shaft. Within the housing the rear end of the driving shaft is provided with a gear 19 and with a circumferential flange 21. Radially within the flange 21 are internal clutch teeth 23. A tapered friction face 25 is formed on the outside of the flange 21.

Gear 19 is in constant mesh with gear 27 on countershaft 29, the countershaft having suitable bearings, not shown, in the casing walls. Countershaft 29 has a low and reverse driving gear 31 and a second speed driving gear 33, the latter being located adjacent the rear end of the shaft. Rotatably mounted on the driven shaft 13 is a gear 35 which is in constant mesh with gear 33. Gear 35 is formed with a flange 37 having internal clutch teeth 39 and an external conical friction face 41.

Between the gears 19 and 35 is a clutch member 43 which is slidably splined on the driven shaft 13. It may be moved by a fork 45 associated with a shift rod 47. The clutch member 43 has teeth 49 at its front end which are intended to engage teeth 23 when the clutch member is moved forwardly to effect a direct drive. It also has teeth 51 to engage teeth 39 when moved to the rear whereby gear 35 is locked against rotation relative to shaft 13 and a second speed drive is completed. Slidably splined on the outside of clutch member 43 is a low speed and reverse driven gear 44. This gear is actuated by a fork 53 carried by shift rod 55. The rods 47 and 55 are to be actuated by a conventional gear shift lever, not shown. A suitable reverse idler, not shown, is to be associated with gear 31 and to be engaged by gear 44 for reverse driving. Engagement of gears 44 and 31 are for low speed driving.

Between the front end of the clutch member 43 and the flange 21 is a movable frictional clutch drum 57. This drum is provided with a friction face as at 58 to overlie and at times engage the frictional face 25, and to constitute therewith a cone clutch, as shown. The drum 57 has spaced radial fingers 59 which enter between the splines of the shaft 13, their dimensions being such as to provide a slight limited circumferential movement of the drum relative to the shaft as well as a longitudinal movement. The end of clutch member 43 having the teeth 49 is also cut out as at 61 to form recesses to provide for the relative axial movement of the clutch member 43 and the drum 57. As is usual with such a device cam faces 77 are provided on the adjacent and contacting faces of the clutch member 43 and the drum 57 to be engaged when the drum is initially rotated by the engagement of parts 58 and 25. These cam faces then function in the usual way to resist further axial movement of clutch member 43 and thus prevent jaw clutch engagement prior to the synchronization effected by the frictional clutch members.

In such devices there are usually provided some means to position and space axially the friction drum having the fingers 59 and also some means to serve as a detent whereby the first axial movement of the equivalent of clutch member 43 brings the frictional clutch faces 58 and 25 together. In most installations these two functions have been provided for by separate and independent parts. In one case a retaining ring on the shaft limits the axial movement of the friction drum and the drum is provided with a resilient wire positioned as a chord to be engaged by the teeth of the sliding jaw clutch member whereby the sliding jaw clutch member pushes the drum axially, the resilient wire thereafter yielding to permit the engagement of the jaw teeth. In my present invention these two functions are performed by a simple and single part illustrated in perspective in Figure 3. Here a driving ring 63 is formed on one of its axial ends with notches 65 which receive the fingers 59 of the drum 57. The other end edge of the ring 63 is cut axially in places as at 67 and is also cut circumferentially at 69 to permit the bending up of spring tongues 71. The end of the ring 63 having the spring tongues engages shoulders 73 formed by reducing the depth of the spline shaft with the result that the axial movement of the ring 63 toward the right as in Figure 1 is prevented. Axial movement in the other direction is prevented by the engagement of the fingers 59 with the bottom of the notches 65, the frictional clutch elements preventing axial movement of the drum 57.

In the operation of the transmission constructed as described when clutch member 43 is moved toward the left, that is in the direction to produce direct driving, undercut ends 75 of clutch member 43 first engage the spring tongues 71. The ring 63 and, with it, the drum 57 is moved slightly in an axial direction and sufficiently to cause contact between the faces 58 and 25. This causes a rotary movement of the drum 57 such as to bring about the engagement of the cam faces at 77 between the drum 57 and the clutch member 43. The engagement of these faces prevents further axial movement of the clutch member 43 until synchronization has been effected by the friction between the elements of the friction clutch. Thereafter it is easily possible to further slide clutch member 43 and bring the jaw teeth 49 and 23 into locking engagement.

By similar successive action of the friction clutches and jaw tooth clutches second speed driving is effected, the action in this case being accomplished by moving clutch member 43 to the right as will be obvious from an inspection of Figure 1. The drum and the combined spacer and detent are represented by numerals 57' and 63' respectively.

Figure 3:
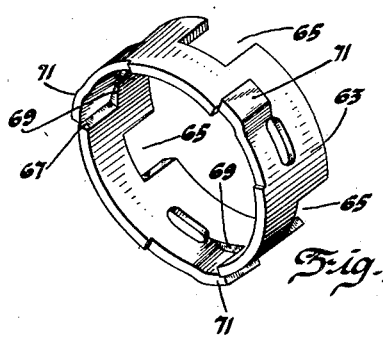
Fig. 3 shows in perspective the novel combined spacer and detent.
Figure 4:
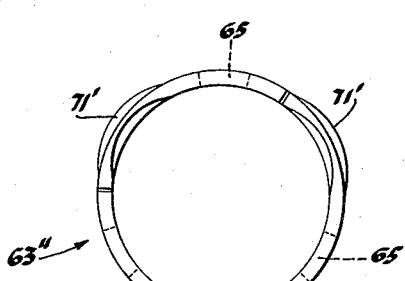
Fig. 4 is an edge view of a modified form of combined spacer and detent.

In Figure 4 is shown a slight modification of the combined spacer and detent. Here the novel element is represented by numeral 63''. It has similar notches 65 on one of its faces. Its other edge has spring fingers 71' which, instead of being bent outwardly at their free ends as in Figure 3 are bowed outwardly between their ends away from the periphery of the ring. When such a member as shown by Figure 4 is used in place of that of Figure 3 it will be understood that the intermediate part of the finger 71' first receives the impact of the sliding clutch member 43 and after synchronization is effected the bowed finger 71' is depressed into the periphery of the ring and the further movement of the sliding clutch member 43 becomes possible.

I claim:

1. In a synchronizing change speed transmission, a friction synchronizing clutch having two elements one of which is a movable frictional clutch element, a combined spacer and detent for said movable frictional clutch element whereby said frictional clutch element is spaced axially and whereby the engagement of the frictional clutch elements is effected, said combined spacer and detent comprising a ring having recesses, said movable frictional clutch element having radial fingers located within said recesses, a shaft upon which said combined spacer and detent is located, a clutch member slidably mounted upon said shaft, said shaft having means to be engaged by said ring, and said ring having a peripheral spring finger to be engaged by a part of said sliding clutch member.

2. A combined spacer and spring detent for a synchronizing friction clutch comprising a ring having on one edge axial notches and having adjacent its other edge spring fingers extending beyond the periphery of the ring.

3. In combination, a first part having jaw teeth and a friction face, a second part to be clutched to said first part, a clutch member movable axially on the second part and having cooperating jaw teeth, an independently movable member on said second part and having a cooperating friction face, a combined spacer and detent on said second part to position said movable frictional member thereon and to serve as a detent whereby the engagement of the frictional clutch members is effected by the movement of the movable jaw clutch member, said combined spacer and detent having a spring finger, said movable friction member and said combined spacer and detent having engaging portions, said second part and said combined spacer and detent also having engaging portions to prevent relative axial movement in one direction whereby said movable frictional clutch member is spaced and whereby said combined spacer and detent, through the instrumentality of its spring finger, is to be engaged by the movement of the jaw clutch member as it slides toward the cooperating jaw clutch member to thereby effect the engagement of the friction faces.

4. In combination, driving and driven members, jaw clutch teeth and a friction face associated with a first one of said members, a jaw toothed clutch element mounted for non-rotatable sliding on a second one of said members, a friction clutch element mounted for limited rotation relative to said second of said members and slidable relative thereto, a combined spacer and detent on said second of said members, said combined spacer and detent and said second of said members having engaging parts to limit relative movement therebetween in one direction, said combined spacer and detent and said movable frictional clutch element having engaging parts whereby the axial movement of the combined spacer and detent may be communicated to the movable frictional clutch element, and yielding means constituting a part of said combined spacer and detent to be first engaged by the movable jaw clutch element to cause the frictional clutch elements to come into contact and thereafter to yield and permit the jaw clutch teeth to engage.

5. In a synchronizing change speed transmission, a shaft, a friction synchronizing clutch having two elements, one of which is rotatable independently of said shaft and the other of which is mounted to move axially of said shaft and for slight relative rotary movement thereon, an annular spacer for said movable frictional clutch element whereby said frictional clutch element is spaced axially, said spacer being mounted on said shaft for limited axial movement and interlocked with said movable clutch element and having yielding parts whereby it may serve as a detent to effect the engagement of the frictional clutch elements.

JAMES M. CRAWFORD.